(12) United States Patent
O'Leary et al.

(10) Patent No.: US 8,204,102 B2
(45) Date of Patent: Jun. 19, 2012

(54) IQ IMBALANCE EQUALIZATION SYSTEM AND METHOD

(75) Inventors: Mark O'Leary, San Diego, CA (US); Arndt Mueller, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 664 days.

(21) Appl. No.: 12/324,657

(22) Filed: Nov. 26, 2008

(65) Prior Publication Data

US 2010/0034250 A1 Feb. 11, 2010

Related U.S. Application Data

(60) Provisional application No. 61/086,937, filed on Aug. 7, 2008.

(51) Int. Cl.
*H03H 7/30* (2006.01)
(52) U.S. Cl. ........................................ 375/229; 375/260
(58) Field of Classification Search .................. 375/229, 375/260
See application file for complete search history.

(56) References Cited

U.S. PATENT DOCUMENTS

| | | | |
|---|---|---|---|
| 2003/0112825 A1* | 6/2003 | Wang et al. | 370/491 |
| 2004/0120411 A1* | 6/2004 | Walton et al. | 375/260 |
| 2005/0141657 A1* | 6/2005 | Maltsev et al. | 375/346 |
| 2005/0259767 A1 | 11/2005 | Garmany et al. | |
| 2007/0092020 A1* | 4/2007 | Seki | 375/267 |
| 2007/0252738 A1* | 11/2007 | Nakagawa | 341/143 |
| 2007/0253323 A1 | 11/2007 | Dapper et al. | |
| 2007/0275674 A1 | 11/2007 | Chien | |
| 2008/0130779 A1 | 6/2008 | Levi et al. | |
| 2008/0175328 A1* | 7/2008 | Lin et al. | 375/260 |
| 2008/0310534 A1* | 12/2008 | Egashira et al. | 375/260 |

* cited by examiner

*Primary Examiner* — Emmanuel Bayard
(74) *Attorney, Agent, or Firm* — Bruce W. Greenhaus; Sheppard Mullin Richter & Hampton LLP

(57) ABSTRACT

Systems and methods for performing channel equalization in a communication system are presented. More particularly, embodiments of the disclosed method and apparatus are directed toward systems and methods for performing channel equalization in an OFDM system. One example of a method of negating the effects of IQ imbalance can include the operations of transmitting a channel estimation string across a channel. The channel estimation string comprises a plurality of known channel estimation symbols. The method further includes logically inverting predetermined symbols within the known channel estimation string; transmitting a second channel estimation string across the channel, the second channel estimation string including the logically inverted predetermined symbols; and estimating the IQ image noise based on received first and second channel estimation symbols.

6 Claims, 6 Drawing Sheets

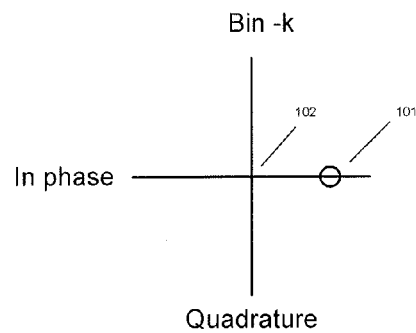
Figure 2a
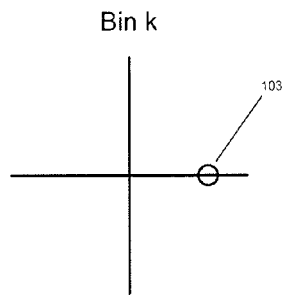
Figure 2b
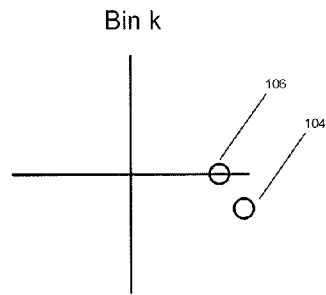
Figure 2c
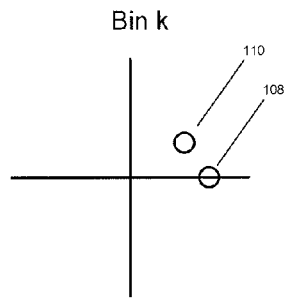
Figure 2d
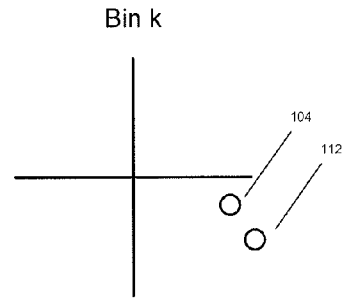
Figure 2e
*Fig. 2*

Figure 5a                    Figure 5b

IQ IMBALANCE EQUALIZATION SYSTEM AND METHOD

RELATED APPLICATIONS

This application claims priority from U.S. provisional patent application entitled "IQ imbalance equalization system and method" Ser. No. 61/086,937 filed Aug. 7, 2008.

TECHNICAL FIELD

The disclosed method and apparatus relates to communication systems, and more particularly, some embodiments relate to IQ imbalance equalization for communications systems.

DESCRIPTION OF THE RELATED ART

Designers of integrated circuits (ICs) face several challenges today. One of these challenges is to increase the capabilities of an IC while decreasing the cost, power consumption and size of the IC. Designers of ICs used in wired and wireless communication devices are no exception. One particular challenge that communications IC designers face involves the imbalance that typically occurs between the in-phase (I) and quadrature-phase (Q) components of a radio frequency (RF) signal when the received RF signal is down-converted to baseband. Such IQ imbalances can limit the achievable operating signal-to-noise ratio (SNR) at the receiver. Limitations in the SNR adversely impact the density of the modulation constellations that can be used and thus the rate at which data can be communicated through the communication system. Although so-called "zero-IF", or "direct-conversion" receivers are preferable for low-cost and power-sensitive applications, they tend to be more sensitive to IQ imbalance. When IQ imbalances are present, spectral components from the associated 'negative' frequency bin can cause interference with the desired signal. However, even in receivers in which a final conversion from the intermediate frequency (IF) to baseband is performed, the heterodyne process employed by the receiver may impose an IQ imbalance.

Another phenomenon that can impact performance is multipath interference. In wireless systems, reflections from buildings, topographic features and other channel anomalies can cause a signal to take two or more different paths between a given transmitter and receiver. Throughout this disclosure, the term channel means the transmission media between a transmitter and a receiver, whether that media is a wire in a wireline system or the space through which a signal is propagated in a wireless system. In wireline systems, imperfect terminations at connections can create reflections of the signals. Whether in wireless or wireline systems, the dominant main signal and any reflected signals can combine in the channel resulting in distortion. In the frequency domain, a reflection produces ripples in the response of the channel, creating amplitude and phase variations across the frequencies of interest. To overcome the effects of the frequency domain ripple, an equalizer is commonly used in the receiver. The use of such equalizers is intended to restore a flat frequency response over the frequencies of interest.

In some systems, such as quadrature-amplitude-modulation (QAM) systems, a signal with a bandwidth that is substantially wider than the coherence bandwidth (i.e., the bandwidth over which the frequency response is essentially flat) can encounter distortion. Accordingly, some systems, for example, OFDM systems, break-up this bandwidth and transmit the data in a plurality of narrowband subcarriers. For example, a data symbol can comprise a plurality of subcarrier symbols. Each subcarrier symbol is transmitted on a different subcarrier having a bandwidth that is substantially narrower than the coherence bandwidth. This reduces the distortion levels, but introduces other challenges, such as variations in the signal losses and phase delays from subcarrier to subcarrier. Accordingly, channel equalization coefficients are computed for each subcarrier to "equalize" the channel.

In OFDM networking environments, equalization can be implemented by sending a known channel estimation symbol over the channel. For example, a known channel estimation symbol is sent in an OFDM data packet. The symbol is examined at the receiver to determine amount of distortion to which the signal has been subjected (i.e., distortions in the relative amplitude and phase of the signal that occur due to the characteristics and nature of the channel). Compensation for such amplitude and phase distortion to the symbol is applied to equalize the channel. In one case, the "ideal" channel estimation symbol (i.e., the channel estimation symbol that would have been received if no variation in amplitude or phase occurred) is divided by the received channel estimation symbol. The result of this operation is an average channel equalization coefficient. The channel equalization coefficient can then be used to correct channel-induced amplitude and phase variations in received data symbols.

OFDM systems transmit data within the payload of a packet. The packet also includes a preamble. The information in the preamble and payload are transmitted using OFDM symbols. Both the OFDM symbols that make up the payload (i.e., data symbols) and the OFDM symbols that make up the preamble (i.e., preamble symbols) are spread over a plurality of subcarriers. In some systems, each of the OFDM symbols is made up of 256 subcarriers. Each subcarrier is modulated with QAM modulation, for example. Accordingly, each OFDM symbol comprises 256 subcarrier symbols (however, in some OFDM systems, only 224 of the 256 subcarriers are used to transmit information). The simplest form of QAM modulation is binary phase shift key (BPSK) modulation.

FIG. 1 illustrates the relationship between a radio frequency carrier and the associated subcarrier bins of an OFDM system, such as the OFMD systems that conform to the MoCA (Multimedia over Coaxial Alliance) industry standard for communicating multimedia content over coaxial cables. As shown in FIG. 1, each of the 256 subcarriers is designated with a reference number (or bin number). For the purpose of this description, the bin numbers start with 0 at the carrier center frequency. The bin numbers increment by one for each subcarrier having a higher frequency than the center frequency. The subcarriers are spaced in increments of 50 MHz divided by 256. The first of the 256 carriers having a higher frequency than the center frequency is designated as bin number 1. The bin numbers increase up to 127 for subcarriers of higher frequency than the center frequency. Likewise, for subcarriers with frequencies lower than the center frequency, the bin numbers start at −1 and decrease (get more negative) in increments of one. The frequency of the subcarrier associated with each bin decreases in increments of 50 MHz divided by 256 with the bin number of the subcarrier with the lowest frequency being −128. For the purpose of this description, bin number −k and bin number k are considered "image bins". Accordingly, bin number −1 and bin number 1 are considered to be image bins, bin number −2 and bin number 2 are considered to be image bins, etc. Said another way, bin number 2 is the image of bin number −2. Likewise, bin number −2 is the image of bin number 2.

In OFDM systems, using OFDM channel estimation symbols to perform channel equalization suffers from the effects of interference between subcarrier symbols, primarily from interference between image bins. Because of interference between image bins, subcarrier symbols associated with some bins are properly corrected, while the error in subcarrier symbols associated with other bins is increased.

FIG. 2a-e illustrate channel estimation subcarrier symbols used for conventional channel equalization. In this example, the channel equalization subcarrier symbols are modulated onto the subcarriers using BPSK modulation. Each channel estimation subcarrier symbol is sent at one of the subcarrier frequencies. For the purpose of this explanation, the variable "k" is used to represent the bin number Those subcarriers that have a frequency that is higher than the carrier center frequency have positive bin numbers ("k"), as shown in FIG. 1. Those subcarriers that have a frequency that is lower than the carrier center frequency have a negative bin number ("-k").

In FIG. 2a, the channel estimation subcarrier symbol has a value of +1, represented by a positive in-phase amplitude and a zero quadrature-phase amplitude, as shown by the dot 101 being placed to the right of the origin 102 and along the x axis of the graph 1. This symbol is sent in bin -k. The same channel estimation subcarrier symbol value +1 is also sent at bin k (shown by the dot 103 in FIG. 2b).

FIG. 2c illustrates the distortion 104 to the value of a channel estimation subcarrier symbol that has an undistorted value 106 of +1 and is modulated in bin k, while a channel estimation subcarrier symbol having a value of 1 is modulated in the image bin -k. As illustrated in FIG. 2c, the channel estimation subcarrier symbol 104 is offset (or distorted) from the desired or "ideal" symbol 106. The offset is equal to the distance between points 104 and 106. This offset is due to the effect of an IQ imbalance which causes some of the information from the $-k^{th}$ bin to "bleed over" into the $k^{th}$ bin. FIG. 2d illustrates the distortion 110 that occurs to the undistorted symbol 108 in the $k^{th}$ bin when the image bin -k is modulated with a symbol having a value of -1. This results in the distortion 110 from the undistorted modulation symbol 108. Accordingly, the channel estimation subcarrier symbol for the $k^{th}$ bin, at the transmitter output, is:

$$y_{k,ce} = x_{k,ce} + \beta_k x^*_{-k,ce} \quad (eq. 1)$$

where $x_{k,ce}$ is the undistorted channel estimation symbol of the $k^{th}$ bin, $x_{-k,ce}$ is the undistorted channel estimation symbol of the $-k^{th}$ bin, and $\delta_k$ is a complex coefficient (less than 1) that is multiplied by $x_{-k,ce}$ to indicate to the amount of image distortion resulting from an IQ imbalance. This equation illustrates that a fraction of the original $-k^{th}$ bin symbol adds to the original $k^{th}$ bin symbol to form the actual transmitted channel estimation symbol for the $k^{th}$ bin. The fact that $\beta_k$ is complex means that it includes both the amplitude distortion and phase distortion (i.e., a rotation to the signal) caused by the IQ imbalance. It should be noted that the distortion is added as the complex conjugate of the value in the $-k^{th}$ bin.

In addition to any distortion that is caused by the IQ imbalance, over the course of transmission, the channel estimation subcarrier symbol is scaled and rotated by the channel. The scaling and rotation is represented by a complex channel coefficient, $c_k$. This scaled and rotated channel estimation subcarrier symbol $r_{k,ce}$ is then received by the receiver and has the value:

$$r_{k,ce} = c_k y_{k,ce} = c_k x_{k,ce} + c_k \beta_k x^*_{-k,ce} \quad (eq. 2)$$

The equalizer system measures the received channel estimation subcarrier symbol, and saves this measurement. Once the equalizer makes the measurement, a correction factor is determined based upon the measurement made by the equalizer. Subsequently received data symbols are equalized by applying the correction factor to the received symbols. However, in measuring the received channel estimation subcarrier symbol, the equalization process cannot distinguish the effect of IQ imbalance $c_k \beta_k x^*_{-k,ce}$ from the effect of the channel $c_k$, and so the measurement includes correction for the IQ imbalance as well as the effect of the channel. This would be a good thing if the effect of the IQ imbalance were constant, since it would eliminate the IQ imbalance. However, the IQ imbalance changes depending upon the value that is modulated into the image bin, as can be seen in equation (1) and equation (2) and FIGS. 2c and 2d.

One channel estimation process estimates $c_k$ by dividing the received symbol by the known channel estimation symbol:

$$\hat{c}_k = \frac{r_{k,ce}}{x_{k,ce}} = \frac{c_k x_{k,ce} + c_k \beta_k x^*_{-k,ce}}{x_{k,ce}} = c_k\left(1 + \beta_k \frac{x^*_{-k,ce}}{x_{k,ce}}\right) \quad (eq. 3)$$

For BPSK channel estimation symbols, $x_{q,ce} \in \{-1+j0, +1+j0\} \forall q$. Therefore $$\frac{x^*_{-k,ce}}{x_{k,ce}} \in \{+1, -1\}.$$

Accordingly, for each subsequently received subcarrier symbol that is equalized, as long as the same value is modulated on the image as was modulated on the image when the equalization measurement was made, the correction will be accurate and will appropriately remove the effects of both the channel distortion and the distortion caused by the IQ imbalance.

However, FIG. 2c and FIG. 2d illustrate that the distortion that occurs when the image subcarrier symbol has a value of -1 is the inverse of the distortion that occurs when the image subcarrier is modulated with a symbol having a value of 1. This is easy to see, since both the real and imaginary parts of $\beta_k$ are multiplied by 1 when the image bin carries a 1 and by -1 when the image bin carries a -1. The distortion occurs to the subcarrier symbol prior to transmission due to the IQ imbalance. Accordingly, applying the same equalization measurement made for FIG. 2d to the symbol of FIG. 2c would result in an increase in the error, as is shown in FIG. 2e in which point 104 is moved to point 112 by the equalizer. It should be noted that FIG. 2e assumes no rotation or scaling due to the channel, but only distortion due to the IQ imbalance.

Accordingly, assuming an equal distribution of data in the image bin, 50% of the time the IQ imbalance causes no or negligible error, and 50% of the time there is an error vector magnitude of approximately $2\beta_k$. In addition to the error caused by the IQ imbalance in the transmitter which is proportional to the coefficient $\beta_k$, residual IQ imbalance in the receiver causes similar errors proportional to a coefficient, $\beta_k^{rx}$, associated with receiver hardware. However, typically there is a small frequency offset between the transmitter and receiver reference oscillators. This frequency offset causes receiver IQ imbalance to generate interference from bins near the image bin and not just from the image bin itself, as is the case with transmitter IQ imbalance. Accordingly, receiver IQ imbalance creates crosstalk with bins near the image bin.

SUMMARY OF DISCLOSED METHOD AND APPARATUS

Various embodiments of the disclosed method and apparatus for channel equalization are presented. Some of these embodiments are directed toward systems and methods for performing channel equalization in an OFDM system.

According to one embodiment, a method of negating the effects of IQ imbalance includes: (1) transmitting a channel estimation string across a channel, the channel estimation string comprising a plurality of known channel estimation symbols; (2) logically inverting predetermined symbols within the known channel estimation string; (3) transmitting a second channel estimation string across the channel, the second channel estimation string including the logically inverted predetermined symbols; and (4) estimating the IQ image noise based on received first and second channel estimation symbols. In one embodiment, the operation of estimating comprises determining a channel equalization coefficient from both the transmitted first and second channel estimation strings.

The IQ image noise can be determined for a plurality of subcarriers that make up the communication channel. For a given subcarrier an estimation of the IQ image noise can include: (1) determining a first equalization coefficient for a channel estimation symbol for that subcarrier in the first channel estimation string; (2) determining a second equalization coefficient for a channel estimation symbol for that subcarrier in the second channel estimation string; and (3) generating an average channel equalization coefficient by computing an average of the first and second equalization coefficients. Accordingly, the IQ image noise can be removed from the equalizer for each of the plurality of subcarriers. It should be noted that since the effects of the IQ imbalance are removed from the equalizer, these effects will remain in the received signal after equalization. Accordingly, the equalizer will only remove the effects of the channel.

In some embodiments, the second channel estimation string comprises the known channel estimation symbols and the logically inverted channel estimation symbols. The second channel estimation string can be transmitted before or after the first channel estimation string. In other embodiments, the symbols of the second channel estimation string are transmitted in a predetermined subcarrier, and the step of logically inverting includes logically inverting only the channel estimation symbols that are designated for a predetermined set of subcarriers. The predetermined set of subcarriers can comprise image subcarrier bins.

In one embodiment, the second channel estimation string comprises the same data as the first channel estimation string and the data of the second channel estimation string is logically inverted at a receiver. The channel estimation symbols can be, for example, BPSK symbols, and inverting a symbol can include changing a symbol from $+1+j_0$ to $-1+j_0$, or from $-1+j_0$ to $+1+j_0$ (Note that in BPSK modulation, the quadrature phase component "j" is always zero prior to any added phase distortion).

In yet another embodiment, a communication transmitter includes: (1) a memory in which channel estimation strings comprising channel estimation symbols are stored; (2) a channel estimation inverter coupled to an output of the memory to receive channel estimation symbols from the memory; (3) a controller coupled to the channel estimation inverter which causes the inverter to invert a portion of the channel estimation symbols; and (4) a radio that transmits channel estimation strings. In one embodiment, the controller inverts half of the channel estimation symbols in a channel estimation string.

In some embodiments, the transmitter is configured to transmit a first channel estimation string across a channel. A second channel estimation string is then sent across the channel. The second channel estimation strings includes a predetermined set of inverted symbols relative to the first channel estimation string. The controller can be configured to invert the portion of the channel estimation symbols in one of the channel estimation strings. Additionally, the second channel estimation string can include the known channel estimation symbols and the inverted channel estimation symbols.

In yet another embodiment, each channel estimation symbol of a channel estimation string is transmitted in a predetermined subcarrier, and only the channel estimation symbols that are designated for a predetermined set of subcarriers are inverted. The predetermined set of subcarriers can be, for example, the image subcarrier bins.

In still another embodiment, a receiver includes: (1) a memory in which a channel estimation string comprising channel estimation symbols is stored; (2) a channel estimation inverter coupled to the memory; (3) a radio that receives channel estimation strings; and (4) a controller coupled to the channel estimation inverter that causes a portion of the received channel estimation symbols to be inverted. The controller can invert half of the channel estimation symbols in a channel estimation string. The controller can also invert the portion of the channel estimation symbols in a first received transmission of a channel estimation string.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the invention, which is defined solely by the claims attached hereto.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 2a-e illustrate examples of channel estimation symbols.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The disclosed method and apparatus performs channel equalization in a communication system. More particularly, embodiments of the disclosed method and apparatus perform channel equalization in an OFDM system. The disclosed method and apparatus is described in terms of transmitter IQ imbalance effects, but analogous effects and advantages apply equally well to receiver-generated IQ imbalance errors or residual errors.

In one embodiment of the disclosed method and apparatus, difficulties associated with conventional equalization systems are avoided by sending two channel estimation strings, or two sets of channel estimation symbols, and calculating a channel equalization coefficient based on the two sets of channel estimation symbols. More particularly, in one embodiment, a first set of channel estimation symbols is sent across the channel. The symbols are distributed among the subcarrier bins for the channel. Then, a second set of channel information symbols is transmitted, but the second set of symbols is different from the first set of symbols. Particularly, in one embodiment, the second set of channel estimation symbols is the same as the first channel estimation symbols except that half of the subcarrier symbols of the second set of channel estimation symbols are inverted.

Averaging between the effects of the first and second set of subcarrier symbols is performed to remove the effects of IQ imbalance from the received channel estimation subcarrier symbols. The average is used to determine an average channel equalization coefficient that does not include a correction factor for the transmitter IQ imbalance. Accordingly, the error vector magnitude for received symbols that have been equalized using the average channel equalization coefficient is always approximately $\beta_k x_{-k,ce}$ rather than being $2\beta_k x_{-k,ce}$ half the time and approximately zero the other half of the time. Because the impact of the error is nonlinear, the doubling of the error, half of the time, causes worse performance when compared with half of the error, all of the time.

The selection of which subcarrier symbols should be inverted can be made in various ways. For example, in one embodiment, the symbols on each of the negative subcarriers (i.e., the $-k^{th}$ bins) are inverted. In another embodiment, the symbols of each of the positive subcarriers are inverted. In yet another embodiment, the subcarrier symbols are inverted in an interlaced pattern. In other words, the symbols on alternate positive and negative subcarriers are inverted.

Figure 1:
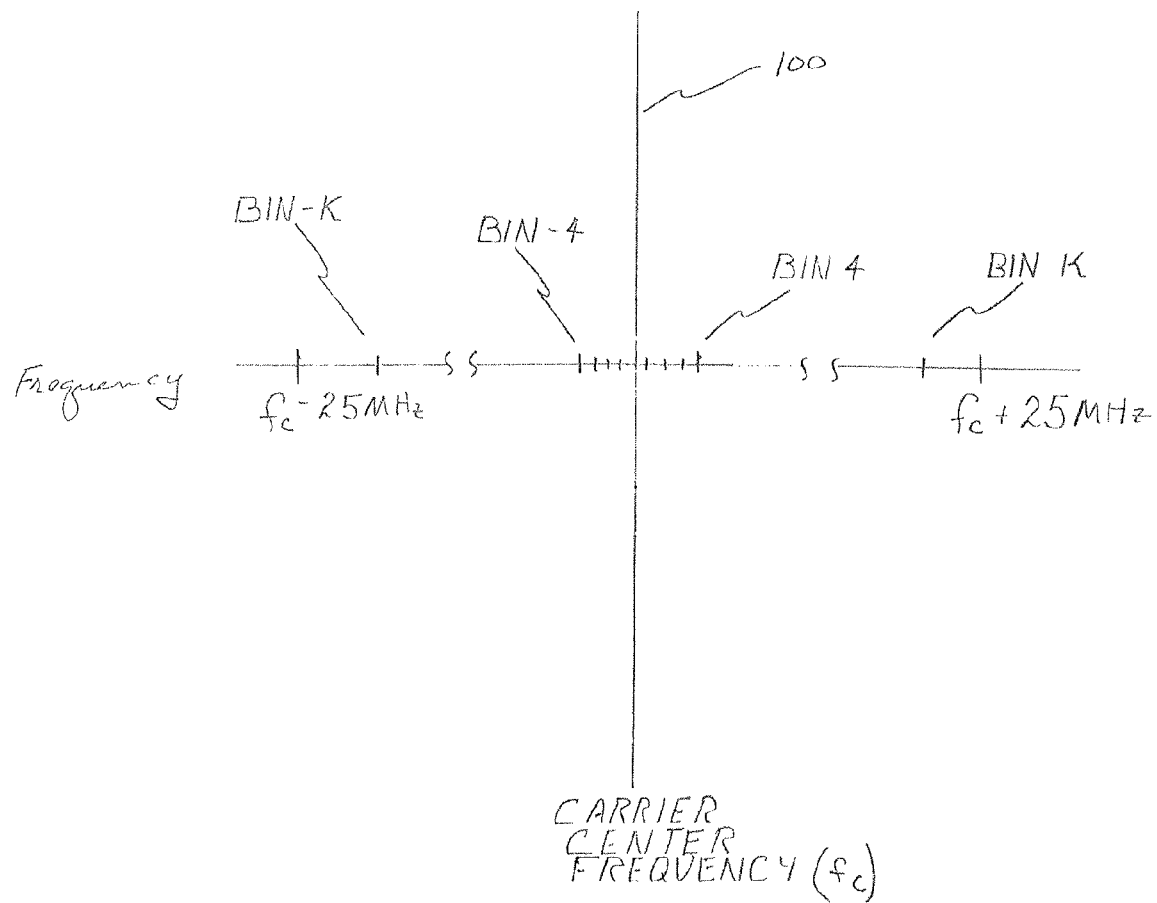
FIG. 1 illustrates the relationship between a radio frequency carrier and the associated subcarrier bins of an OFDM system, such as the system used with the MOCA (Multimedia Over Coaxial Alliance) industry standard for communicating multimedia content over coaxial cables.
Figure 3:
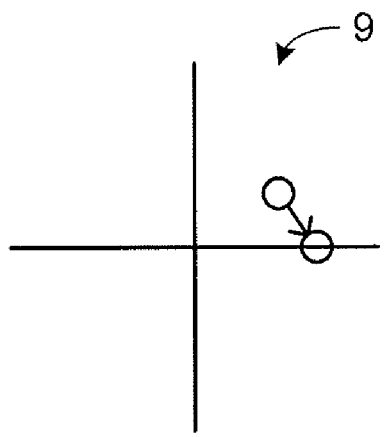
FIG. 3 is a diagram illustrating an example where the error is corrected accurately 50% of the time and the magnitude of the error is approximately doubled the other 50% of the time.
Figure 3:
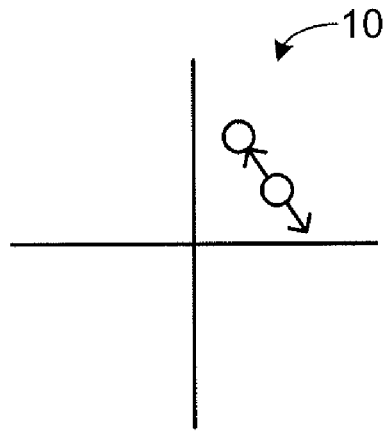
Figure 3:
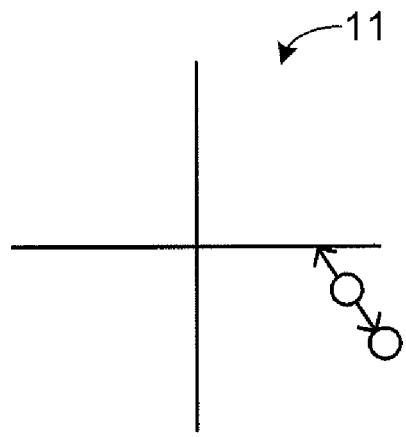
Figure 3:
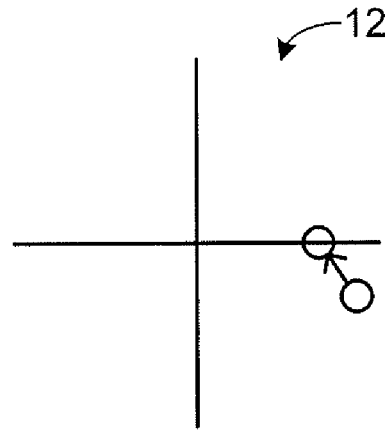
Figure 4:
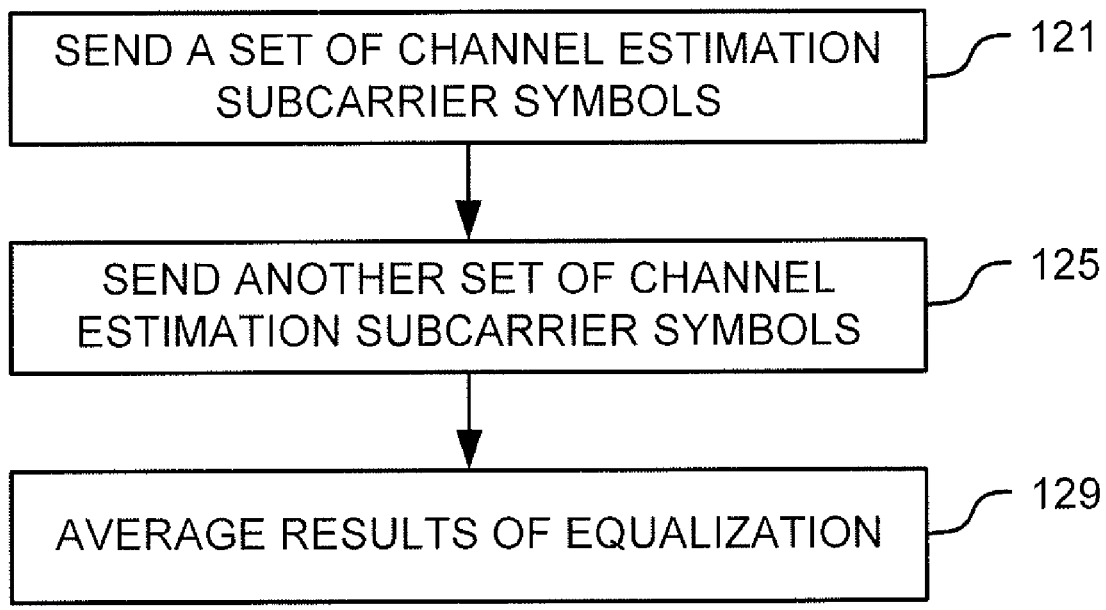
FIG. 4 is a diagram illustrating an example process for channel estimation in accordance with one embodiment of the disclosed method and apparatus.

FIG. 4 is a diagram illustrating an example process for channel estimation in accordance with one embodiment of the disclosed method and apparatus. In STEP 121, a first set of channel estimation symbols is sent across the communication channel.

In STEP 125, a second set of channel estimation subcarrier symbols is sent across the communication channel. In one embodiment, certain symbols in the second set of channel estimation subcarrier symbols are inverted. For example, either the symbols on the negative subcarriers or the symbols on the positive subcarriers are inverted prior to transmission. In some embodiments, including embodiments in which OFDM is used, the channel estimation subcarrier symbols are BPSK symbols. Accordingly, in such embodiments, a symbol is inverted by multiplying that symbol by −1. For example, $+1+j_0$ is inverted to be $-1-j_0$. BPSK is commonly used in OFDM applications. For a system that uses BPSK $j_0=0$. That is, the imaginary part of the symbol (+j) is always zero in BPSK modulation.

In STEP 129, the results of the equalization steps are averaged to obtain an average channel equalization coefficient for which the effects of the IQ imbalance are removed. Then, in operation, the new average channel equalization coefficient can be applied to data sent across the channel. Inverting half of the channel estimation symbols when measuring the channel and generating the average channel equalization coefficient removes any contribution from IQ imbalance from the average channel equalization coefficient. Therefore, an error will be present on the recovered equalized data subcarrier symbols as a result of the transmitter's IQ imbalance. However, by removing the effects of the IQ imbalance by generating the average channel equalization coefficient, the error is approximately one-half of the worst-case error that occurs in conventional equalization systems described above.

As noted above, in conventional equalization systems perfect (or near perfect) equalization occurs in approximately one half of the received symbols. However, the error is doubled in the other half of the symbols. Because the impact of the error is nonlinear, this doubling of the error can be detrimental to the performance of the system. In contrast, in embodiments of the disclosed method and apparatus, half of this worst-case error appears in each symbol. Accordingly, due to the non-linear nature of the system, it is typically preferable to have half of the error all of the time rather than the worst-case error half of the time on the equalized data.

Figure 5:
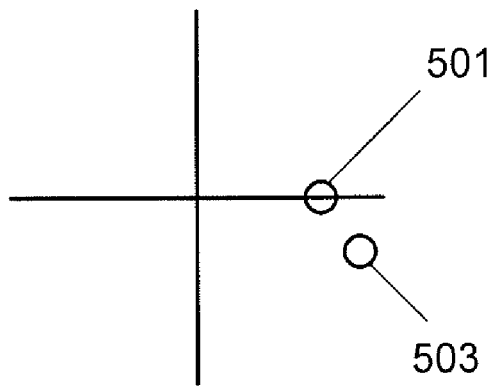
FIGS. 5a and 5b illustrate channel equalization symbols resulting from the equalization system described with respect to FIG. 4.
Figure 5:
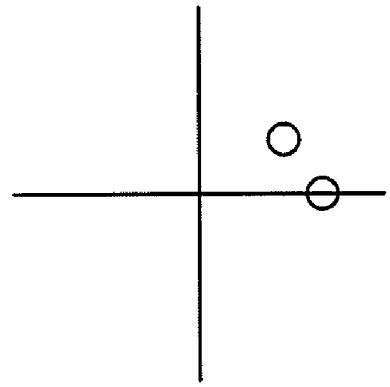

FIGS. 5a and 5b illustrate channel equalization symbols that result from the equalization system described in FIG. 4. Referring now to FIG. 5a, the point 501 illustrates the ideal value of data bin k before equalization. In this case, the $k^{th}$ bin was modulated with the symbol +1. The point 503 in FIG. 5a illustrates the value of the data bin k with distortion caused by the IQ imbalance and after equalization. Note that the equalization does nothing to correct for the IQ imbalance, but will correct for any channel effects (i.e., scaling and rotation caused by the channel). The average channel equalization coefficient used to equalize the data in bin k is the average of a first measurement made when the $-k^{th}$ bin contains +1 and a second measurement made when the $-k^{th}$ bin contains −1. As can be seen, applying this average channel equalization coefficient results in an error after equalization. The error is caused by the IQ imbalance which remains in the received symbol, since the IQ imbalance has been removed from the average channel equalization coefficient by averaging the two measurements. Similarly, FIG. 5b shows the scenario for data bin k modulated with a symbol having a value of +1, after equalization, where the $-k^{th}$ bin is modulated with a symbol having a value of −1. The average channel equalization coefficient used to equalize the data in bin k is the average of a first measurement made when the $-k^{th}$ bin contains +1 and a second measurement made when the $-k^{th}$ bin contains −1.

In contrast, FIG. 2e shows the situation where this error is doubled. FIG. 2e shows the scenario for the received constellation in the $k^{th}$ bin after equalization having a value of +1. The equalization was performed with the $-k^{th}$ bin having a symbol with a value of −1 at the time the +1 was being transmitted in the $k^{th}$ bin. However, the channel equalization coefficient was determined from a channel estimation symbol in which the value of the symbol for the $-k^{th}$ bin was +1.

Figure 6:
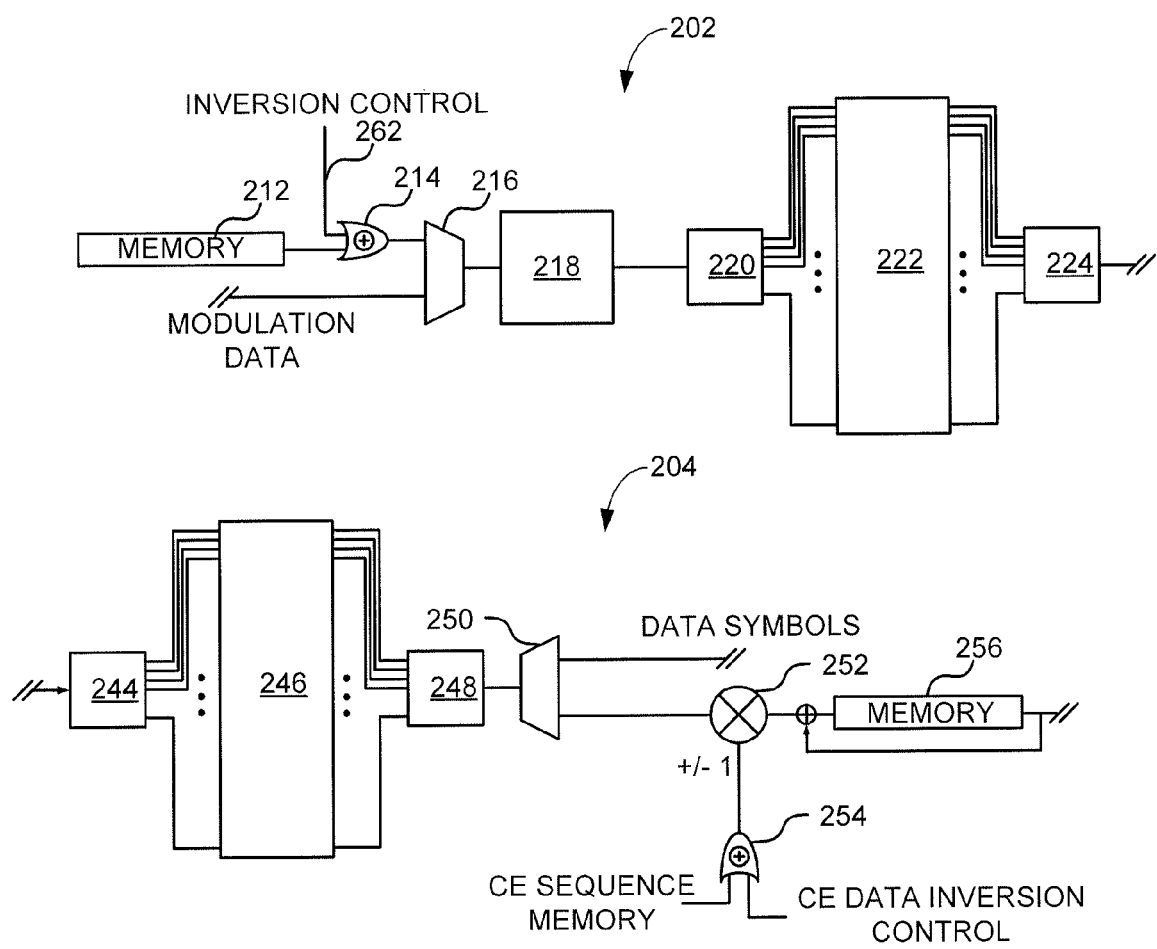
FIG. 6 is a block diagram illustrating an example architecture for channel equalization in accordance with one embodiment of the disclosed method and apparatus.

As will be appreciated by one of ordinary skill in the art after reading the above examples, a number of different architectures can be used to implement this and other embodiments of the disclosed method and apparatus. FIG. 6 is a block diagram illustrating one such example architecture for channel equalization in accordance with the disclosed method and apparatus. The architecture of FIG. 6 can be used to invert a plurality of channel estimation symbols for the equalization process. The transmit architecture 202 includes a channel estimation sequence memory 212, a channel estimation inverter 214, a multiplexer or switch 216, a constellation mapper 218, a serial-to-parallel converter 220, an inverse fast Fourier transform block 222 and a parallel-to-serial converter 224. The receiver architecture 204 includes a serial-to-parallel converter 244, a fast Fourier transform block 246, a parallel-to-serial converter 248, a multiplexer or switch 250, a mixer 252, a channel estimation inverter 254, and a channel equalization coefficient memory 256.

In the transmitter, a channel estimation string comprising a series of channel estimation symbols, is stored in the channel sequence memory 212. In one embodiment, the same sequence can be stored in the memory 212 and reused for equalization. This is particularly true when a plurality of the subcarrier symbols of the first channel estimation string or sequence are inverted.

Modulation data is received by the system, selected by the multiplexer 216 and sent to the constellation mapper 218. Constellation mapper 218 maps the received modulation data into a plurality of constellation symbols that are complex numbers, unless BPSK modulation is being used. The constellations are forwarded to the serial-to-parallel converter 220, which places each of the data bits into its respective subcarrier. The inverse fast Fourier transform block 222 converts these into time domain symbols for transmission across the channel. The sequence is similar for transmitting channel estimation and equalization symbols, however instead of utilizing modulation data (or actual data), the channel estimation sequence that was stored in the memory 212 is used. In terms of the example described above with respect to FIG. 4, in STEP 121, the channel estimation sequence is retrieved from the memory 212 and sent through the inverter 214 (which is depicted in FIG. 6 as an exclusive-OR gate). It should be understood by those skilled in the art that the inverter 214 may be a hardware inverter, such as the exclusive-OR gate shown in FIG. 6, a software inverter wherein the inversion is performed by a processor running software code, or some combination of hardware and software. Hardware inverters can be fashioned in many ways, such as by an amplifier, transistor, switch, logic gate, etc.

The inverted signal is selected by the multiplexer 216 and switched into the mapper 218. The channel estimation sequence is mapped to the constellation and the serial-to-parallel converter 220 places the constellations into their respective subcarrier channels. The inverse Fourier transform places the symbols in the time domain for transmission across the channel.

As stated above with respect to STEP 125 of FIG. 4, the channel estimation process is repeated, but with selected symbols in the channel estimation sequence inverted. Accordingly, in this step, the channel estimation sequence is retrieved from the memory 212 and sent through the exclusive-OR gate 214. However, in this step, a controller (not shown) can set a control bit in line 262 to selectively invert subcarrier symbols of the channel estimation sequence. Accordingly, the stream of inverted and non-inverted channel estimation symbols is selected by the multiplexer 216 and sent to the mapper 218 for constellation mapping. Again, the serial-to-parallel converter 220 places the symbols into their respective channels, and the inverse Fourier transform block 222 creates time domain symbols for transmission across the channel.

At the receive side, the symbols sent across the channel are received and broken into their constituent subcarriers by the serial-to-parallel converter 244. The fast Fourier transform block 246 places these into the frequency domain and sends them to the parallel-to-serial converter 248 where they can be placed into a sequence of symbols. The demultiplexer 250 couples data symbols to the mixer 252. Alternatively, if channel estimation symbols are received, the channel estimation symbols are sent to a processor (not shown) where they are used to characterize the channel. The value of each received symbol is divided by the value of the "ideal" symbol that was supposed to have been received (which is stored in memory at the receiver). The results are the channel equalization coefficients, which are stored in the channel equalization coefficient memory 256. A channel estimation inverter 254 can be used to invert the stored channel estimation sequence to remove the inversion in the received symbols. After removing the inversion, the symbols can be compared with the "ideal" symbols. The stored channel equalization coefficients can then be averaged and the average channel equalization coefficient can be used to equalize received data.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary) embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A transmit architecture comprising:
a) a channel estimation inverter configured to receive a first channel estimation string, the first channel estimation string comprising a plurality of channel estimation symbols;
b) a controller coupled to the channel estimation inverter and configured to cause the inverter to invert some of the symbols of the first channel estimation string to generate a second channel estimation string having some inverted symbols and some non-inverted symbols; and
c) a transmitter configured to:
   i) send the first channel estimation string over a plurality of bins comprising pairs of image bins; and
   ii) send the second channel estimation string over the plurality of bins such that one bin of each pair carries an inverted symbol and one bin of each pair carriers a non-inverted symbol.

2. The transmitter of claim 1, wherein the controller is configured to invert half of the channel estimation symbols in the second channel estimation string.

3. A receiver architecture comprising:
a) a receiver configured to receive a first channel estimation string and a second channel estimation string;
b) a channel estimation inverter coupled to the receiver; and
c) a controller coupled to the channel estimation inverter and configured to:
   i) cause a portion of the second channel estimation string to be inverted; and
   ii) generate an average channel equalization coefficient by:
      A) generating a first channel equalization coefficient from the values of the first channel estimation string;
      B) generating a second channel equalization coefficient from the values of the second channel estimation string; and
      C) averaging the first channel equalization coefficient and the second channel equalization coefficient.

4. The receiver architecture of claim 3, wherein the controller is configured to invert half of the channel estimation symbols in a channel estimation string.

5. A transmit architecture comprising:
a) a channel estimation inverter means for inverting a portion of a received first channel estimation string, the first channel estimation string comprising a plurality of channel estimation symbols;
b) a controller coupled to the channel estimation inverter means and configured to cause the inverter means to invert some of the symbols of the first channel estimation string to generate a second channel estimation string having some inverted symbols and some non-inverted symbols; and
c) a transmitter configured to:
   i) send the first channel estimation string over a plurality of bins comprising pairs of image bins; and
   ii) send the second channel estimation string over the plurality of bins such that one bin of each pair carries an inverted symbol and one bin of each pair carriers a non-inverted symbol.

6. A receiver architecture comprising:
a) a receiver configured to receive a first channel estimation string and a second channel estimation string;
b) an inverter means coupled to the receiver; and
c) a controller coupled to the inverter means and configured to:
   i) cause a portion of the second channel estimation string to be inverted; and
   ii) generate an average channel equalization coefficient by:
      A) generating a first channel equalization coefficient from the values of the first channel estimation string;
      B) generating a second channel equalization coefficient from the values of the second channel estimation string; and
      C) averaging the first channel equalization coefficient and the second channel equalization coefficient.

* * * * *